(12) United States Patent
Diwan

(10) Patent No.: US 12,458,510 B2
(45) Date of Patent: Nov. 4, 2025

(54) BONE GRAFT DELIVERY SYSTEM AND METHOD FOR USE IN SPINAL AND ORTHOPEDIC SURGERY

(71) Applicant: Ashish Diwan, Kogarah (AU)

(72) Inventor: Ashish Diwan, Kogarah (AU)

(*) Notice: Subject to any disclaimer, the term of this patent is extended or adjusted under 35 U.S.C. 154(b) by 279 days.

(21) Appl. No.: 18/202,618

(22) Filed: May 26, 2023

(65) Prior Publication Data
US 2024/0074875 A1 Mar. 7, 2024

Related U.S. Application Data

(60) Provisional application No. 63/402,998, filed on Sep. 1, 2022.

(51) Int. Cl.
| | |
|---|---|
| *A61F 2/46* | (2006.01) |
| *A61B 17/88* | (2006.01) |
| *A61B 17/00* | (2006.01) |
| *A61B 17/56* | (2006.01) |

(52) U.S. Cl.
CPC ........ *A61F 2/4601* (2013.01); *A61B 17/8825* (2013.01); *A61B 2017/00526* (2013.01); *A61B 2017/564* (2013.01)

(58) Field of Classification Search
CPC .............. A61F 2/4601; A61B 17/8825; A61B 17/8819; A61B 17/8822
See application file for complete search history.

(56) References Cited

U.S. PATENT DOCUMENTS

| | | | | |
|---|---|---|---|---|
| 6,676,664 | B1* | 1/2004 | Al-Assir | A61F 2/4601 |
| | | | | 606/92 |
| 2002/0010431 | A1* | 1/2002 | Dixon | A61F 2/4601 |
| | | | | 604/221 |
| 2003/0069545 | A1* | 4/2003 | Arm | A61B 17/8822 |
| | | | | 604/218 |
| 2005/0222538 | A1* | 10/2005 | Embry | A61B 17/8822 |
| | | | | 604/82 |
| 2010/0282774 | A1* | 11/2010 | Greter | B05C 17/00553 |
| | | | | 222/137 |

OTHER PUBLICATIONS https://www.surgentec.com/graft-delivery-device/graftgun/.
https://www.globusmedical.com/products/instafill-graft-delivery-system/.
https://www.medtronic.com/content/dam/medtronic-com/products/spinal-orthopaedic/bone-grafting/documents/accelerate-bone-graft-delivery-with-grafton-brochure.pdf.
https://www.nordsonmedical.com/Components-and-Technologies/Biomaterial-Delivery-Devices/Bone-Graft-Delivery-Devices/.

* cited by examiner

*Primary Examiner* — Amy R Sipp
(74) *Attorney, Agent, or Firm* — James R. McDaniel

(57) ABSTRACT

The present invention is generally related to a bone graft material delivery system and method for use in spinal and orthopedic surgery. In particular, the delivery system includes a flowable or non-flowable bone graft material or composite within a multi-barreled syringe. The multi-barreled syringe is then encased within an autoclavable shell. In this manner, the multi-barreled syringe in the shell (syringe-shell-system) will be able to generate the necessary pressure for delivery of the flowable or non-flowable bone graft material or composite to the desired spinal or orthopedic surgical site.

8 Claims, 10 Drawing Sheets

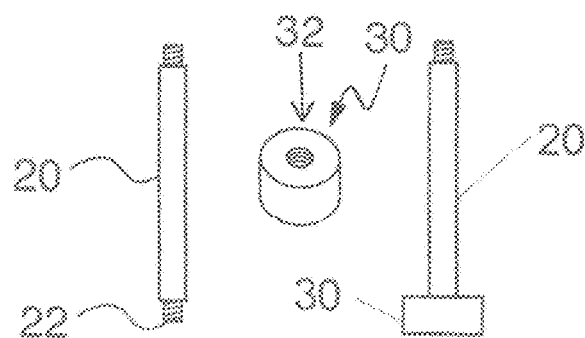
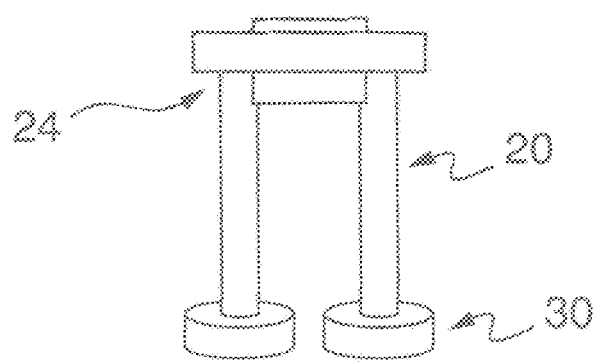
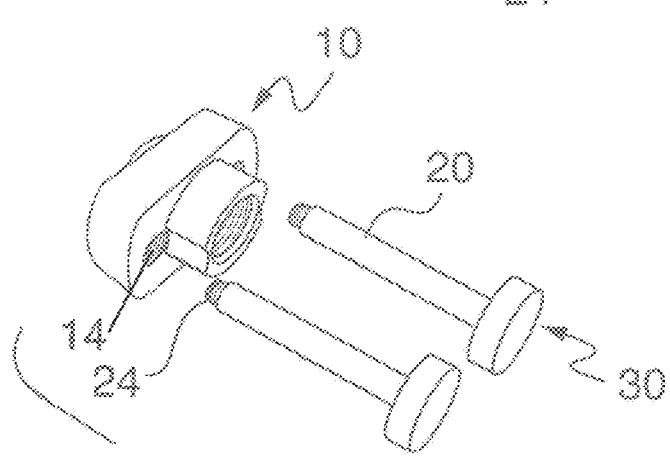
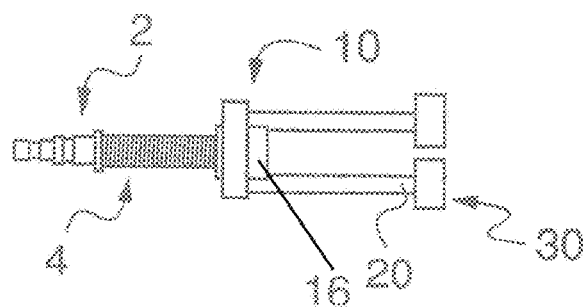
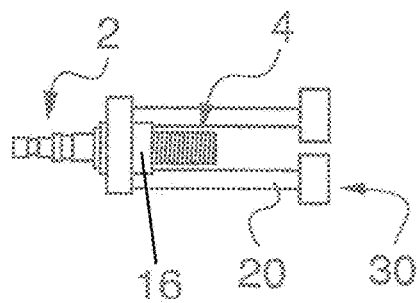

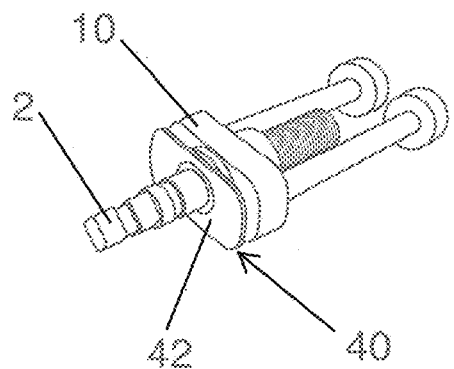
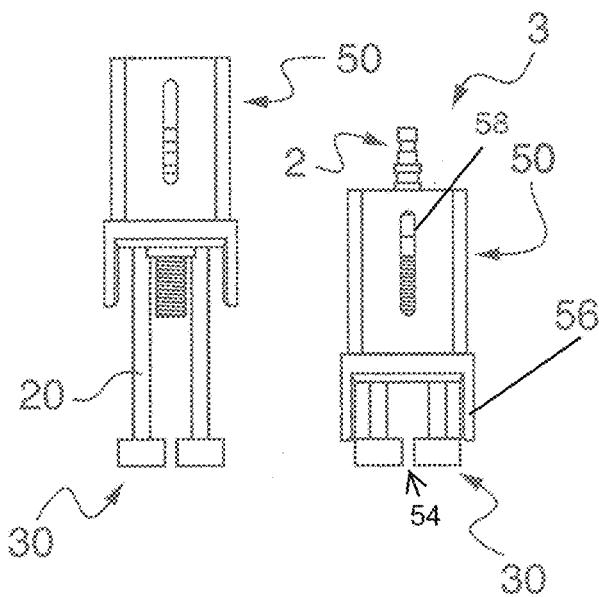
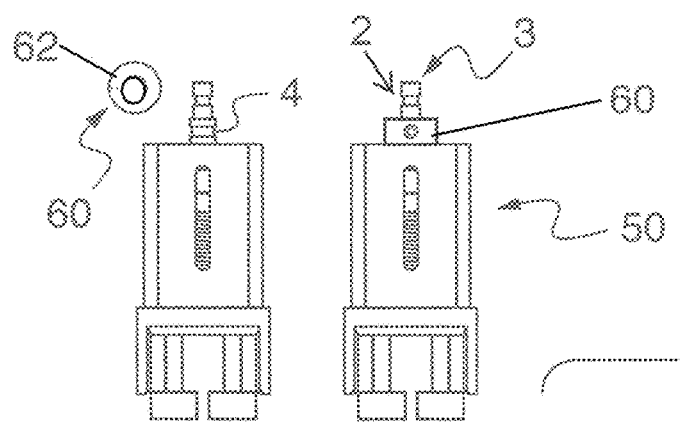
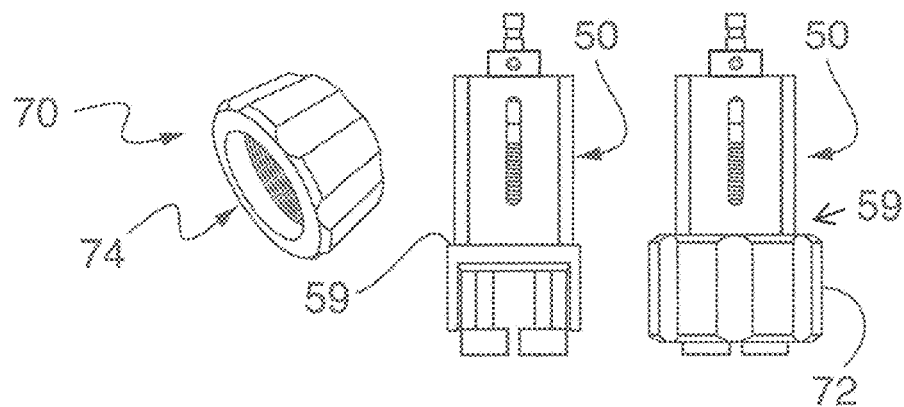

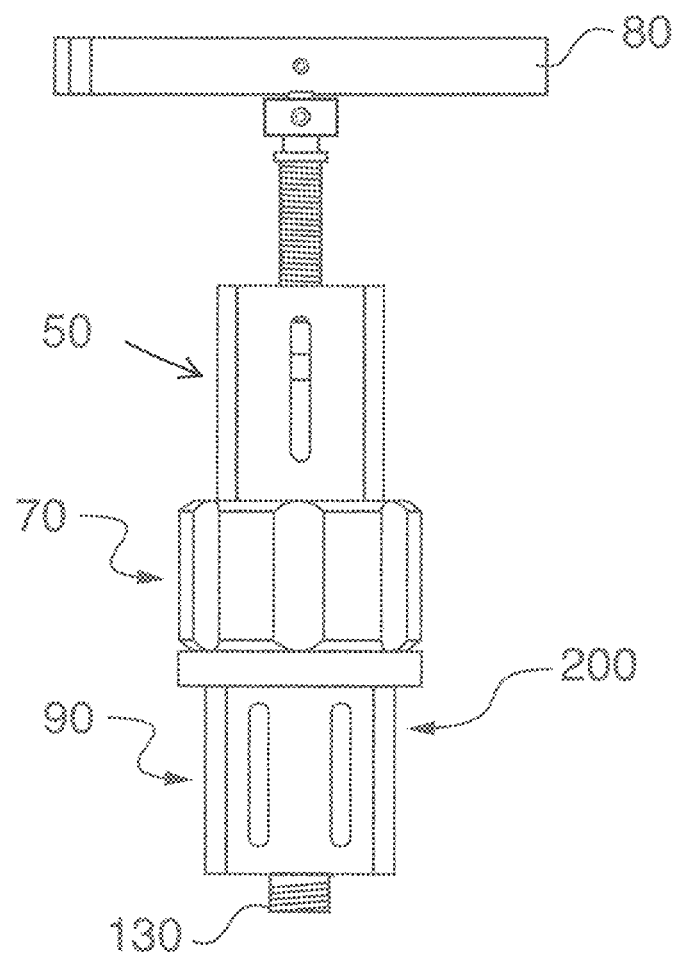

BONE GRAFT DELIVERY SYSTEM AND METHOD FOR USE IN SPINAL AND ORTHOPEDIC SURGERY

CROSS-REFERENCE TO RELATED APPLICATION

This application claims benefit of U.S. Patent Application No. 63/402,998, filed on Sep. 1, 2022, the disclosure of which is hereby incorporated by reference in its entirety to provide continuity of disclosure to the extent such a disclosure is not inconsistent with the disclosure herein.

FIELD OF THE INVENTION

The present invention is generally related to a bone graft material delivery system and method for use in spinal and orthopedic surgery. In particular, the delivery system includes a flowable or non-flowable bone graft material or composite within a multi-barreled syringe. The multi-barreled syringe is then encased within an autoclavable shell. In this manner, the multi-barreled syringe in the shell (syringe-shell-system) will be able to generate the necessary pressure for delivery of the flowable or non-flowable bone graft material or composite to the desired spinal or orthopedic surgical site.

In one embodiment, the bone graft delivery system provides the ability to back fill implants, specifically interbody cages when performing spinal fusion. In another embodiment, the bone graft delivery system can fill and fix vertebral crush fractures, where the current state of the art is to use a bone cement like PMMA (polymethyl methacrylate). In yet another embodiment, the bone graft delivery system can be used to fill subchondral bone defects in fractures around various joints, large and small, which may have undergone either internal or external fixation or no fixation. Also, the bone graft delivery system can be used as an adjunct to or can itself be integrated with spinal or orthopedic navigation systems and robotic arms. Finally, the bone graft delivery system can be constructed to include readable pressure devices and/or be integrated with a servo-controlled motorized system for delivery of a bone graft or composite. For example, such a composite can be bone cement of various types including PMMA.

BACKGROUND OF THE INVENTION

Prior to the present invention, as set forth in general terms above and more specifically below, it is known, that the rapid development in minimally invasive surgery involving the spine and extremities has focused on the development of access tools and implants. However, with a desire to decrease the size of the access to the surgical sites, it has become increasingly difficult to place bone grafts or bone graft substitutes in the operative field in a clinically effective and safe manner.

Furthermore, it is also known to employ syringes or other similar devices to assist in the delivery of the flowable or non-flowable bone graft material or composite. However, these known syringes have been known to mechanically fail during the surgical procedure. In particular, the known syringes have been known to split or otherwise lose their structural integrity during the surgical procedure due the large compression forces that are exerted along the walls of the syringe while the flowable or non-flowable bone graft material or composite is being injected into the surgical site.

It is a purpose of this invention to fulfill these and other needs in the bone graft delivery art in a manner more apparent to the skilled artisan once given the following disclosure.

The preferred bone graft delivery system and method for use in spinal and orthopedic surgery, according to various embodiments of the present invention, offers the following advantages: ease of use; reduced likelihood of syringe structure failure; the ability to more easily introduce the flowable or non-flowable bone graft material or composite into the surgical site a clinically effective and safe manner; lightness in weight; the ability to properly sterilize the bone graft delivery system; the ability to back fill surgical implants; the ability to use the bone graft delivery system in conjunction with spinal or orthopedic navigation systems and robotic arms; the ability to utilize readable pressure devices and/or be integrated with a servo-controlled motorized system for delivery of a bone graft or composite; and reduced cost. In fact, in many of the preferred embodiments, these advantages are optimized to an extent that is considerably higher than heretofore achieved in prior, known bone graft delivery systems and methods for use in spinal and orthopedic surgery.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 20 is a schematic illustration of the plunger and plunger shaft for use in the bone graft delivery system and method which can be used in spinal and orthopedic surgery, constructed according to the present invention;

FIGS. 21a and 21b are schematic illustrations of the drive shaft plate being attached to the plungers, according to the present invention;

FIGS. 22a and 22b are schematic illustrations of the drive shaft being attached to the drive shaft plate, according to the present invention;

FIG. 23 is a schematic illustration of the washer plate being attached to the drive shaft, according to the present invention;

FIG. 24 is a schematic illustration of the drive shaft holder being located over the drive shaft, according to the present invention;

FIG. 25 is a schematic illustration of the locking plate being attached to the drive shaft holder, according to the present invention;

FIG. 26 is a schematic illustration of the locking nut being attached to the drive shaft, according to the present invention;

FIG. 28 is a schematic illustration of the double barrel assembly being installed within the barrel holder in order to create a fully constructed bone graft delivery system, according to the present invention.

DETAILED DESCRIPTION OF THE PREFERRED EMBODIMENTS OF THE INVENTION

In order to address the shortcomings of the prior, known bone graft delivery systems and methods for use in spinal and orthopedic surgery, it would be desirable to provide a bone graft delivery system that includes a flowable or non-flowable bone graft material or composite within a multi-barreled syringe. Furthermore, the multi-barreled syringe should be encased within an autoclavable shell. In this manner, the multi-barreled syringe will be able to generate the necessary pressure for delivery of the flowable or non-flowable bone graft material or composite to the desired spinal or orthopedic surgical site.

In one embodiment, the bone graft delivery system provides the ability to back fill implants, specifically interbody cages when performing spinal fusion. Also, the bone graft delivery system can be used as an adjunct to or can itself be integrated with spinal or orthopedic navigation systems and robotic arms. Finally, the bone graft delivery system can be constructed to include readable pressure devices and/or be integrated with a servo-controlled motorized system for delivery of a bone graft or composite. For example, such a composite can be bone cement of various types including polymethylmethacrylate (PMMA).

Bone Graft Delivery System Components

Figure 1:
FIG. 1 is a schematic illustration of a drive shaft for use in a bone graft delivery system and method which can be used in spinal and orthopedic surgery, constructed according to the present invention.

With respect to FIGS. 1-17, there are illustrated the various components of the bone graft delivery system 500 (FIGS. 27A-29). As shown in FIG. 1, drive shaft 2 is illustrated. In one embodiment, drive shaft 2 includes, in part, drive shaft end 3 and drive shaft threaded section 4. Preferably, drive shaft 2 is constructed of any suitable, durable high strength, medical grade material such as stainless steel. Also, preferably, drive shaft end 3 and drive shaft threaded section 4 are formed on drive shaft 2 by conventional techniques such as grinding, forming, milling, threading or the like.

Figure 2:
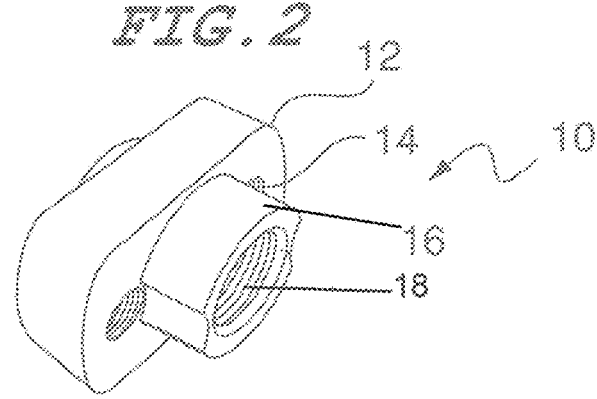
FIG. 2 is a schematic illustration of a drive shaft plate for use in the bone graft delivery system and method which can be used in spinal and orthopedic surgery, constructed according to the present invention.

As shown in FIG. 2, drive shaft plate 10 is illustrated. In one embodiment, drive shaft plate 10 includes, in part, base 12, threaded openings 14, and extension 16 having threaded interior 18. Preferably, drive shaft plate 10 is constructed of any suitable, durable high strength, medical grade material such as stainless steel. Also, preferably, threaded openings 14, extension 16, and threaded interior 18 are formed on drive shaft plate 10 by conventional techniques such as grinding, forming, milling, threading or the like.

Figure 3:
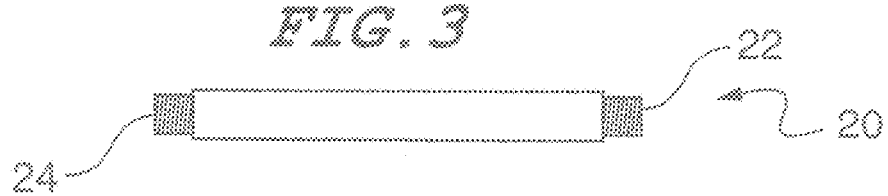
FIG. 3 is a schematic illustration of a plunger shaft for use in the bone graft delivery system and method which can be used in spinal and orthopedic surgery, constructed according to the present invention.

As shown in FIG. 3, plunger shaft 20 is illustrated. In one embodiment, shaft 20 includes, in part, plunger shaft ends 22, 24 and plunger shaft base 26. Preferably, plunger shaft 20 is constructed of any suitable, durable high strength, medical grade material such as stainless steel. Also, preferably, plunger shaft ends 22 and 24 are formed on plunger shaft base 26 by conventional techniques such as grinding, forming, milling, threading or the like.

Figure 4:
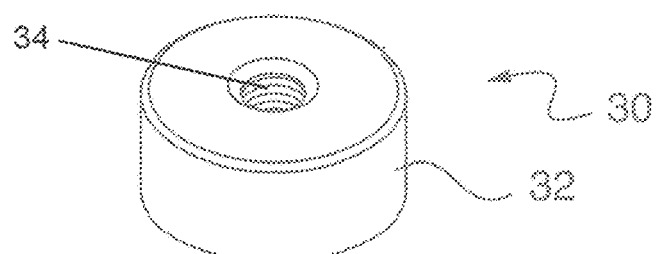
FIG. 4 is a schematic illustration of a plunger for use in the bone graft delivery system and method which can be used in spinal and orthopedic surgery, constructed according to the present invention.

As shown in FIG. 4, plunger 30 is illustrated. In one embodiment, plunger 30 includes, in part, plunger base 32 and threaded opening 34. Preferably, plunger 30 is constructed of any suitable, durable high strength, medical grade material such as stainless steel. Also, preferably, threaded opening 34 is formed on plunger 30 by conventional techniques such as grinding, forming, milling, threading or the like.

Figure 5:
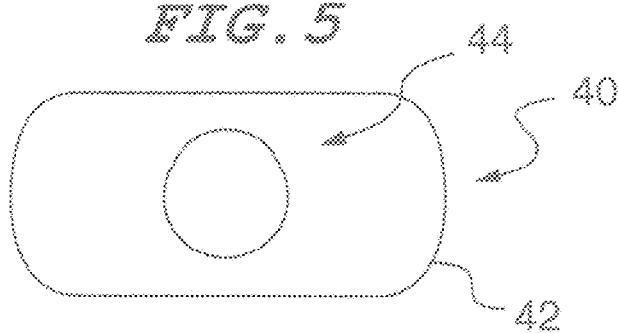
FIG. 5 is a schematic illustration of a washer plate for use in the bone graft delivery system and method which can be used in spinal and orthopedic surgery, constructed according to the present invention.

As shown in FIG. 5, washer plate 40 is illustrated. In one embodiment, washer plate 40 includes, in part, washer plate base 42 and opening 44. Preferably, washer plate 40 is constructed of any suitable, durable high strength, medical grade material such as stainless steel. Also, preferably, opening 44 is formed on washer plate 40 by conventional techniques such as grinding, forming, milling, threading or the like.

Figure 6:
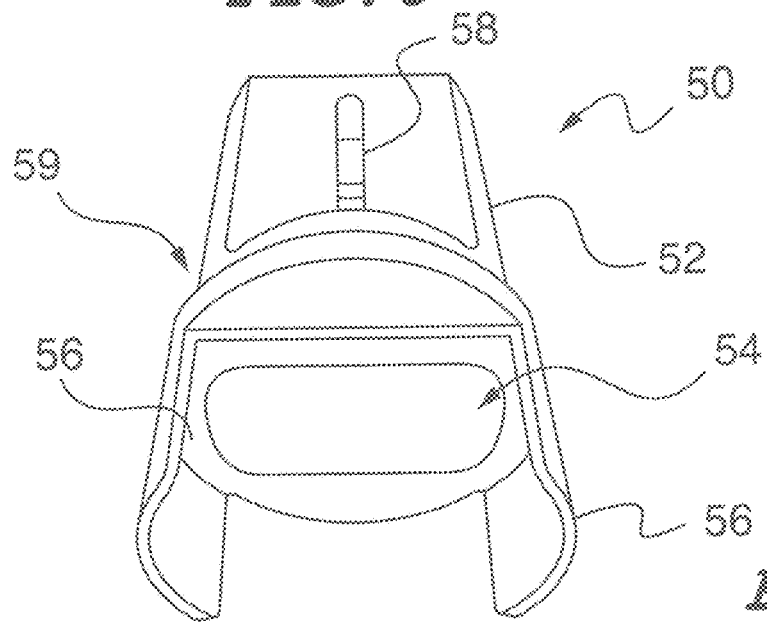
FIG. 6 is a schematic illustration of a drive shaft holder for use in the bone graft delivery system and method which can be used in spinal and orthopedic surgery, constructed according to the present invention.

As shown in FIG. 6, drive shaft holder 50 is illustrated. In one embodiment, drive shaft holder 50 includes, in part, base 52, opening 54, base extensions 56, opening 58, and edge 59. Preferably, drive shaft holder 50 is constructed of any suitable, durable high strength, medical grade polymeric material including a thermoplastic such as polyacetal or polyoxymethylene (POM). Also, preferably, opening 54, base extensions 56, opening 58, and edge 59 are formed on drive shaft holder 50 by conventional techniques such as grinding, forming, milling, threading or the like.

Figure 7:
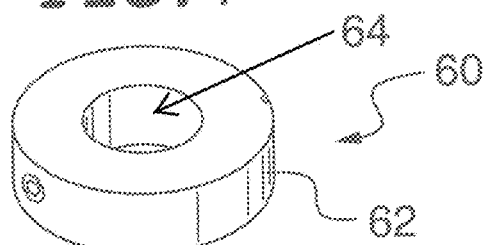
FIG. 7 is a schematic illustration of a locking plate for use in the bone graft delivery system and method which can be used in spinal and orthopedic surgery, constructed according to the present invention.

As shown in FIG. 7, locking plate 60 is illustrated. In one embodiment, locking plate 60 includes, in part, base 62 and opening 64. Preferably, locking plate 60 is constructed of any suitable, durable high strength, medical grade material such as stainless steel. Also, preferably, opening 64 is formed on base 62 by conventional techniques such as grinding, forming, milling, threading or the like.

Figure 8:
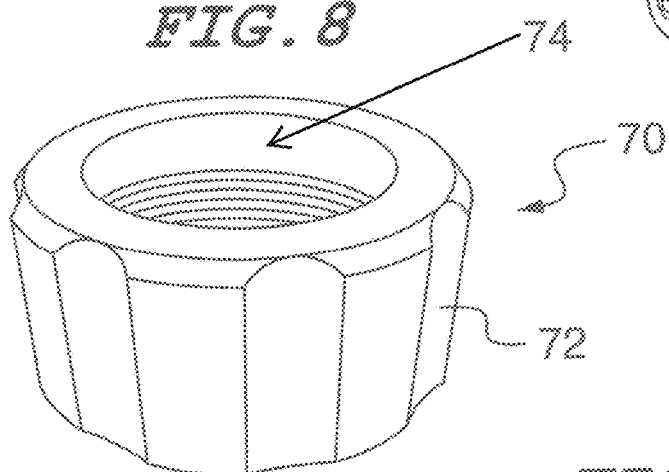
FIG. 8 is a schematic illustration of a locking nut for use in the bone graft delivery system and method which can be used in spinal and orthopedic surgery, constructed according to the present invention.

As shown in FIG. 8, locking nut 70 is illustrated. In one embodiment, locking nut 70 includes, in part, base 72 and threaded opening 74. Preferably, locking nut 70 is constructed of any suitable, durable high strength, medical polymeric grade material including a thermoplastic such as polyacetal or POM. Also, preferably, threaded opening 74 is formed on locking nut 70 by conventional techniques such as grinding, forming, milling, threading or the like.

Figure 9:
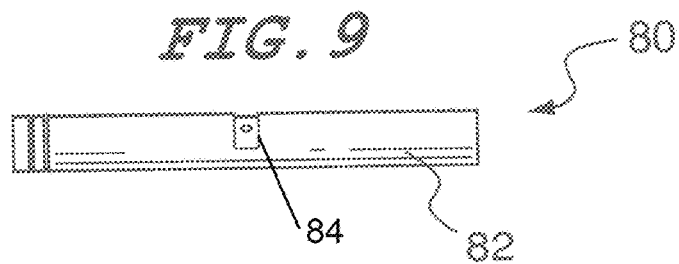
FIG. 9 is a schematic illustration of a handle for use in the bone graft delivery system and method which can be used in spinal and orthopedic surgery, constructed according to the present invention.

As shown in FIG. 9, handle 80 is illustrated. In one embodiment, handle 80 includes, in part, base 82 and threaded opening 84. Preferably, handle 80 is constructed of any suitable, durable high strength, medical grade material such as stainless steel. Also, preferably, threaded opening 84 is formed on base 82 by conventional techniques such as grinding, forming, milling, threading or the like.

Figure 10:
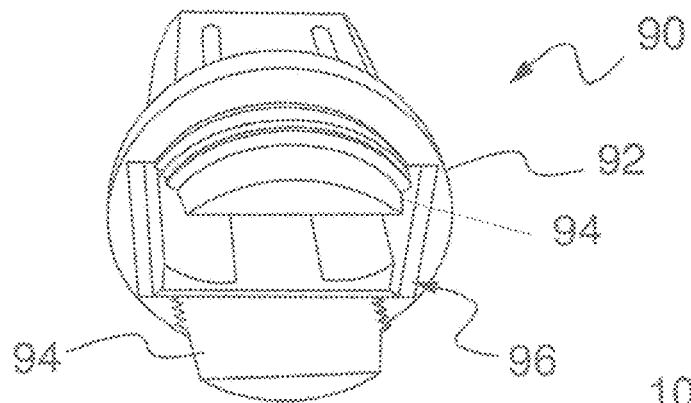
FIG. 10 is a schematic illustration of a barrel holder for use in the bone graft delivery system and method which can be used in spinal and orthopedic surgery, constructed according to the present invention.

As shown in FIG. 10, barrel holder 90 is illustrated. In one embodiment, barrel holder 90 includes, in part, base 92, threaded barrel holder extensions 94, and barrel opening 96. Preferably, barrel holder 90 is constructed of any suitable, durable high strength, medical grade polymeric material including a thermoplastic such as an Acetal plastic like Ertacetal-C®. Also, preferably, threaded barrel extensions 94 and barrel opening 96 are formed on barrel holder 90 by conventional techniques such as grinding, forming, milling, threading or the like.

Figure 11:
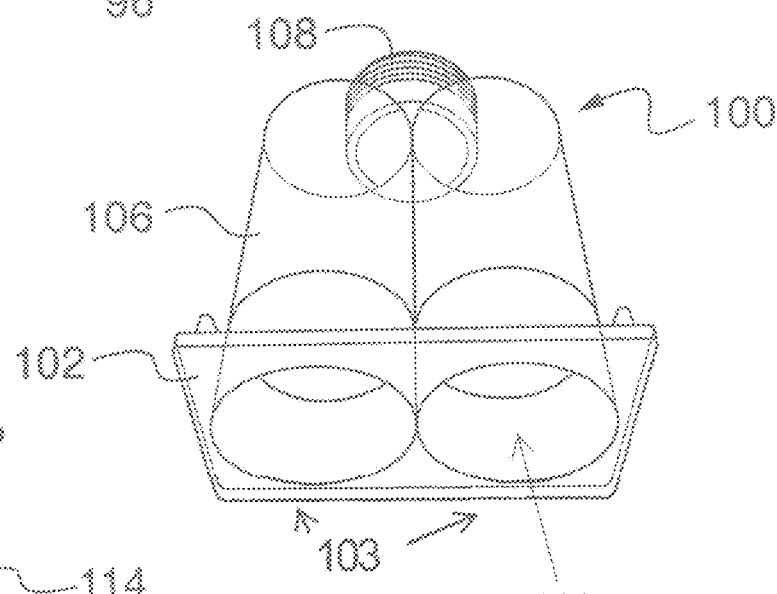
FIG. 11 is a schematic illustration of a barrel for use in the bone graft delivery system and method which can be used in spinal and orthopedic surgery, constructed according to the present invention.

As shown in FIG. 11, barrel assembly 100 is illustrated. In one embodiment, barrel assembly 100 includes, in part, base 102, base openings 103, barrel openings 104, barrels 106, and threaded barrel connector 108. Preferably, barrel assembly 100 is constructed as a unitary piece of any suitable, durable high strength, medical grade polymeric material such as polycarbonate or polypropylene. Also, preferably, base 102, barrel openings 104, barrels 106, and threaded barrel connector 108 are formed on barrel assembly 100 by conventional techniques such as grinding, forming, milling, threading or the like.

Figure 12:
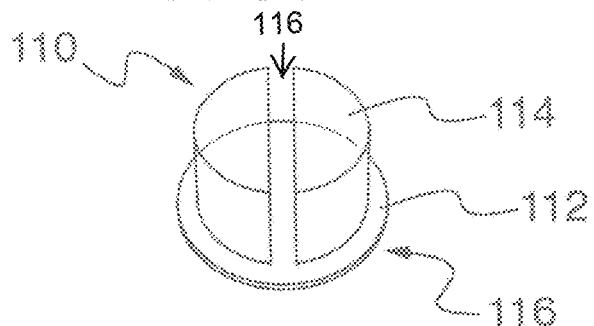
FIG. 12 is a schematic illustration of a polycarbonate (PC) pad for use in the bone graft delivery system and method which can be used in spinal and orthopedic surgery, constructed according to the present invention.
Figure 18:
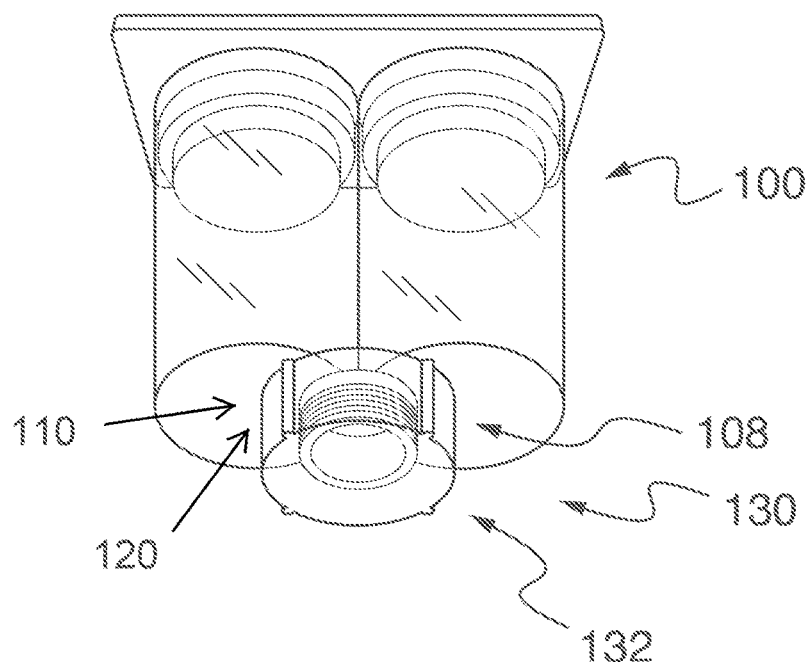
FIG. 18 is a schematic illustration of a double barrel assembly for use in the bone graft delivery system and method which can be used in spinal and orthopedic surgery, constructed according to the present invention.

As shown in FIG. 12, polycarbonate (PC) pad 110 is illustrated. In one embodiment, PC pad 110 includes, in part, base 112, extensions 114, and slot 116. Preferably, PC pad 110 is constructed of any suitable, durable high strength, medical grade polymeric material such as polycarbonate Also, preferably, base 112, extensions 114, and slot 116 are formed on PC pad 110 by conventional techniques such as grinding, forming, milling, threading or the like. It is to be understood that the PC pad 110 is critical in retaining and containing the flowable or non-flowable bone graft material or composite in the barrel assembly 100 as a plug-in. A unique aspect of the present invention is the use of the PC pad 110. In particular, the PC pad 110 allows for "cushioned compression of the PC pad 110 when the cap 130 is tightened on to threaded barrel connector 108 (FIG. 18).

Figure 13:
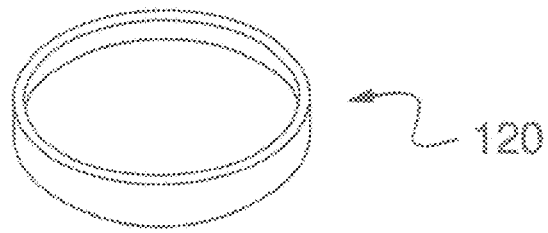
FIG. 13 is a schematic illustration of a silicone pad for use in the bone graft delivery system and method which can be used in spinal and orthopedic surgery, constructed according to the present invention.

As shown in FIG. 13, silicone pad 120 is illustrated. Preferably, silicone pad 120 is constructed of any suitable, durable high strength, medical grade polymeric material such as silicone. In one embodiment, the silicone pad 120 creates a dampening effect between the elements of FIG. 12 (slot 116) and FIG. 14 (inside of the cap 132) (FIG. 18). In particular, the interaction between the silicone pad 120 and the cap 130 when the cap 130 is twisted onto the threaded barrel connector 108 assists in creating a "dampening or cushioning" effect by the silicone pad 120 on the cap 130. It is to be understood that the PC pad 110 and the silicone pad 120 are removed when the delivery tube assembly 160 is connected to the threaded barrel connector 108.

Figure 14:
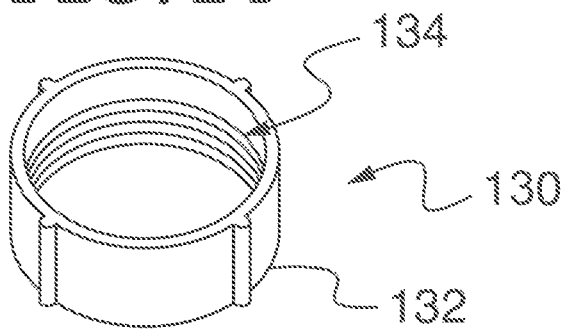
FIG. 14 is a schematic illustration of a cap for use in the bone graft delivery system and method which can be used in spinal and orthopedic surgery, constructed according to the present invention.

As shown in FIG. 14, cap 130 is illustrated. In one embodiment, cap 130 includes, in part, base 132 and threaded opening 134. Preferably, cap 130 is constructed of any suitable, durable high strength, medical grade polymeric material such as polycarbonate. Also, preferably, base 132 and threaded opening are formed on cap 130 by conventional techniques such as grinding, forming, milling, threading or the like.

Figure 15:
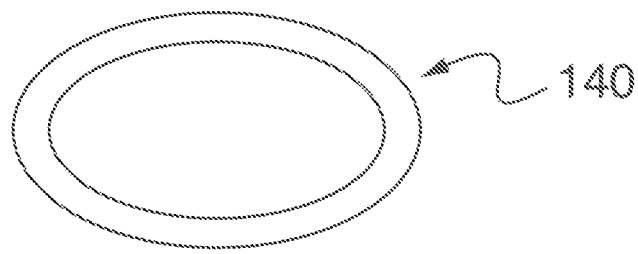
FIG. 15 is a schematic illustration of an O-ring for use in the bone graft delivery system and method which can be used in spinal and orthopedic surgery, constructed according to the present invention.

As shown in FIG. 15, O-ring 140 is illustrated. Preferably, O-ring 140 is constructed of any suitable, durable high strength, medical grade polymeric material such as silicone. In one embodiment, O-ring 140 allows for the gliding of the plunger 150 while maintaining the pressure within the bars 106.

Figure 16:
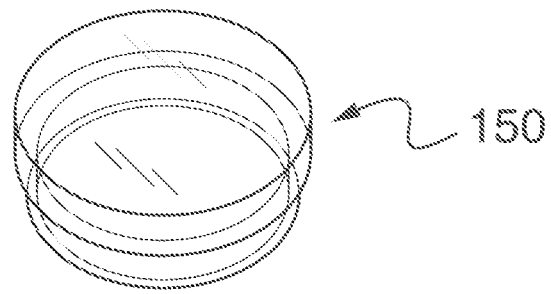
FIG. 16 is a schematic illustration of a plunger for use in the bone graft delivery system and method which can be used in spinal and orthopedic surgery, constructed according to the present invention.

As shown in FIG. 16, plunger 150 is illustrated. Preferably, plunger 150 is constructed of any suitable, durable high strength, medical grade polymeric material such as polycarbonate. In one embodiment, the plunger 150 assists in pushing the flowable or non-flowable bone graft material or composite in the barrel 106 forward thereby enabling ejection of the flowable or non-flowable bone graft material or composite.

Figure 17:
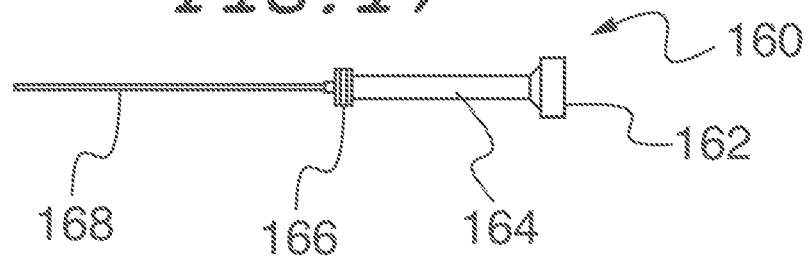
FIG. 17 is a schematic illustration of a delivery tube for use in the bone graft delivery system and method which can be used in spinal and orthopedic surgery, constructed according to the present invention.

As shown in FIG. 17, delivery tube assembly 160 is illustrated. In one embodiment, delivery tube assembly 160 includes, in part, delivery tube base 162, delivery tube extension 164, injector needle connector 166, and injector needle 168. Preferably, injector needle 168 is constructed of any suitable, durable high strength, medical grade material such as stainless steel. Preferably, delivery tube base 162, delivery tube extension 164, and injector needle connector 166 are constructed of any suitable, durable high strength, medical grade polymeric material such as polycarbonate and polypropylene. Finally, delivery tube base 162, delivery tube extension 164, and injector needle connector 166 preferably, are formed on delivery tube assembly 160 by conventional techniques such as grinding, forming, milling, threading or the like. As will be discussed in greater detail later, delivery tube assembly 160 is attached to threaded barrel connector 108 by attaching delivery tube base 162 to threaded barrel connector 108. Also, injector needle 168 can be removably connected to injector needle connector 166.

Construction of Bone Graft Delivery System

With respect to the construction of the bone graft delivery system 500, attention is now directed to FIGS. 1-30. As shown in FIG. 18, double barrel assembly 200 is constructed by attaching cap 130 to barrel assembly 100. In particular, the threaded opening 132 of cap 130 is threaded onto the threaded barrel connector 108 by conventional techniques.

Figure 19:
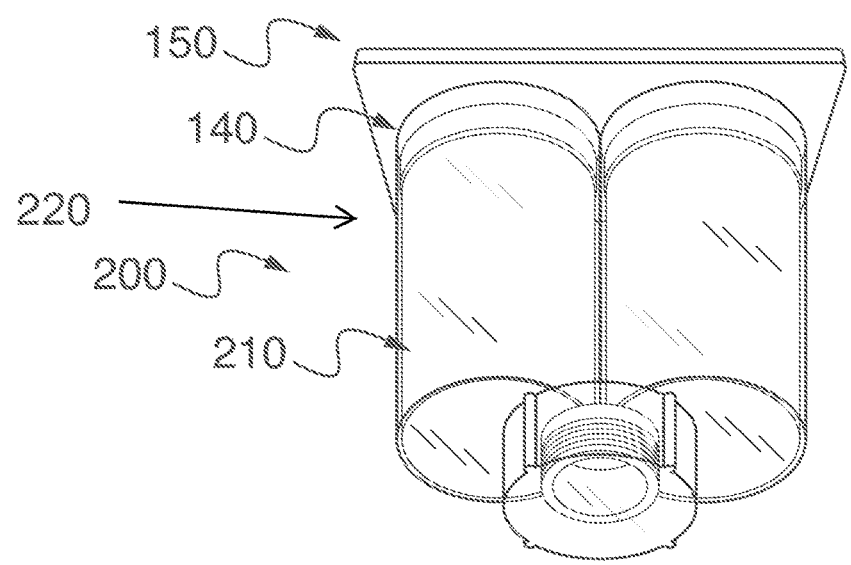
FIG. 19 is a schematic illustration of a double barrel assembly for use in the bone graft delivery system and method which can be used in spinal and orthopedic surgery, constructed according to the present invention.

As shown in FIG. 19, an O-ring 140 has been placed on top of each container 210. In one embodiment, container 210 contains an amount of the flowable or non-flowable bone graft material or composite 220. It is to be understood that a plurality of containers 210 are illustrated in FIG. 19. In this manner, the materials contained within each container 210 are then conventionally mixed or otherwise combined together within the delivery tube assembly 160 and the mixed composition is then delivered to the surgical site. A plunger 150 is then placed on top of the O-ring 140. The plungers 30 (FIG. 20) will interact with the plunger 150 in order to force the flowable or non-flowable bone graft material or composite 220 out of the barrel assembly 100, as will be discussed in greater detail later.

With respect to FIG. 20, plunger 30 has been attached to plunger shaft 20. In particular, the threaded opening 32 on plunger 30 has been threaded onto one end 22 of plunger shaft 20. It is to be understood that this procedure will be conducted twice so that two (2) plungers 30 will be attached to two (2) plunger shafts 20.

With respect to FIGS. 21a and 21b, the drive shaft plate 10 has been attached to the other ends 24 of each of the plunger shafts 24 by threading the plunger ends 24 into the threaded openings 14 in the drive shaft plate 10.

With respect to FIGS. 22a and 22b, the drive shaft 2 has been attached to the drive shaft plate 10. In particular, the drive shaft threaded section 4 has been threaded into the threaded interior 18 of extension 16 of drive shaft plate 10.

With respect to FIG. 23, the washer plate 40 has been located over drive shaft 2 and adjacent to one end of drive shaft plate 10. In particular, the drive shaft 2 has been located within the opening 42 in washer plate 40.

With respect to FIG. 24, drive shaft holder 50 has been located over the drive shaft assembly shown in FIG. 23. In particular, drive shaft holder 50 is located over the drive shaft 2, the plunger shafts 20, and the plungers 30 so that drive shaft end 3 extends out of opening 58 in drive shaft holder 50. Furthermore, plunger shafts 20 are located adjacent to base extensions 56 and plungers 30 extend below base extensions 56.

With respect to FIG. 25, locking plate 60 has been attached to the drive shaft threaded section 4 adjacent to drive shaft end 3. In particular, the threaded opening 62 in locking plate 60 has been threaded onto the drive shaft threaded section 4 in order to securely retain the drive shaft holder 50 onto drive shaft 2.

With respect to FIG. 26, locking nut 70 has been located over drive shaft holder 50. In particular, the threaded opening 74 in locking nut 70 has been placed onto drive shaft holder 50 so that threaded opening 74 contacts edge 59 on drive shaft holder 50.

Figure 27A:
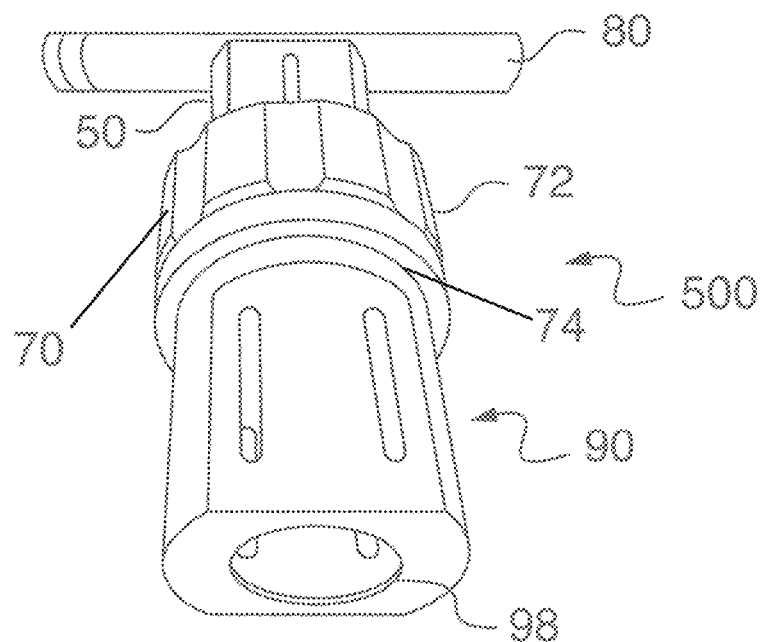
FIGS. 27a and 27b are schematic illustrations of the handle being attached to the drive shaft, according to the present invention.
Figure 27B:
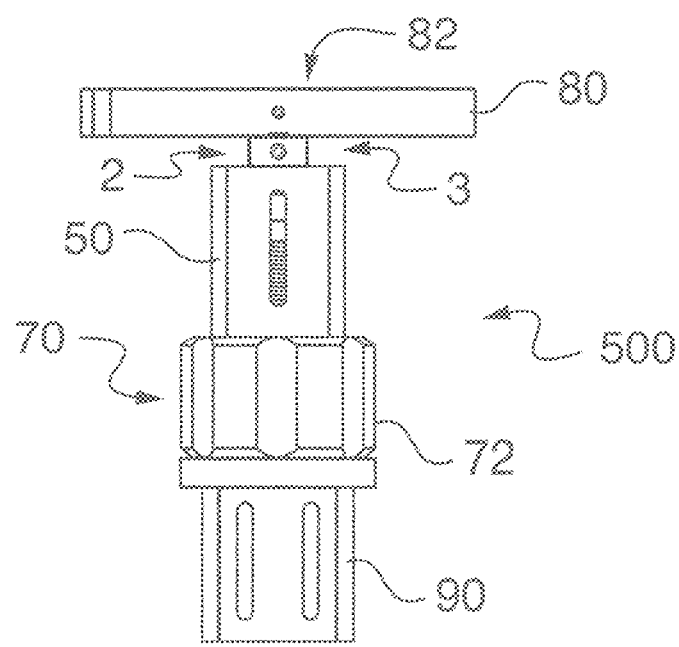

With respect to FIGS. 27a and 27b, the barrel holder 90 and the handle 80 have been attached to the drive shaft holder 50. In particular, the threaded opening 74 in the locking nut 70 has been threaded onto the threaded barrel holder extensions 94 of barrel holder 90 in order to secure the barrel holder 90 to the drive shaft holder 50. Also, the handle 80 has been secured to the drive shaft end 3 by attaching the threaded opening 84 to the drive shaft end 3.

Operation of Bone Graft Delivery System

Regarding the operation of bone graft delivery system 500, attention is again directed to FIGS. 1-29. In particular, containers 210 of flowable or non-flowable bone graft material or composite 220 are inserted into barrel openings 104 of barrel assembly 200 (FIG. 19). After the containers 210 have been inserted into the barrel openings 104, the barrel assembly 200 is placed into the barrel opening 96 such that the base 102 is located adjacent to the base 92 and the cap 130 extends out of barrel opening 98 of barrel holder 90 (FIG. 28). Furthermore, a plunger 150 has been placed on top of each container 210, as shown in FIG. 19.

Once the containers have been properly located within barrel holder 90, barrel holder 90 is attached to drive shaft holder 50 in a similar manner as shown in FIGS. 27a and 27b. It is to be understood that the user must pull or otherwise move handle 80 so that handle 80 is located a desired distance away from drive shaft holder 50. This will ensure that when the user pushes down on handle 80, the interaction between the handle 80, the drive shaft 2, the plunger shafts 20, and the plungers 30 will cause the flowable or non-flowable bone graft material or composite to be ejected or otherwise move out of the containers.

After the barrel holder 90 has been attached to drive shaft holder 50, the user determines that the cap 130 of barrel assembly 200 extends a proper distance out of the barrel opening 98 of barrel holder 90 and the handle extends a proper distance away from the drive shaft holder 50 (FIG. 28).

Figure 29:
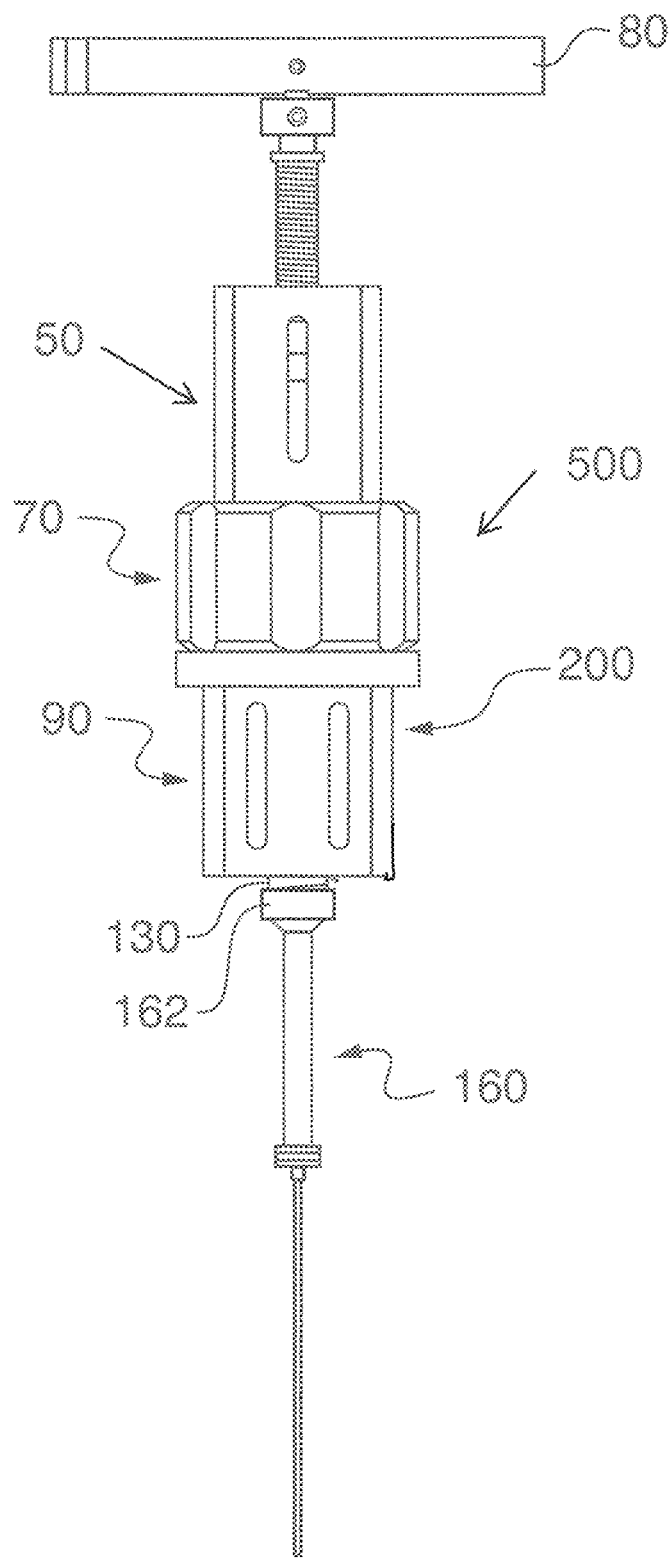
FIG. 29 is a schematic illustration of the double assembly cap extending out of the opening in the barrel holder and the delivery tube being attached to the barrel connector, according to the present invention.

Upon determining that the cap 130 of barrel assembly 200 extends a proper distance out of barrel opening 98 of barrel holder 90 and the handle 80 extends a proper distance away from the drive shaft holder 50, the user removes cap 130. The user then attaches delivery tube assembly 160 to threaded barrel connector 108 by attaching delivery tube base 162 to threaded barrel connector 108 (FIG. 29).

Once the delivery tube assembly 160 has been properly connected to barrel assembly 200, the user can then push or otherwise interact with the handle 80 in order to cause the flowable or non-flowable bone graft material or composite to eject out of or otherwise move out of the containers 210, through the delivery tube extension 164, through the injector needle connector 166, and out of the injector needle 168 into the surgical site.

A unique aspect of the present invention is that the bone graft delivery system 500 provides the ability to back fill implants (not shown), specifically interbody cages when performing spinal fusion. Also, the bone graft delivery system 500 can be used as an adjunct to or can itself be integrated with spinal or orthopedic navigation systems and robotic arms (not shown). Finally, the bone graft delivery system 600 can be constructed to include readable pressure devices (not shown) and/or be integrated with a servo-controlled motorized system for delivery of a bone graft or composite (not shown). For example, such a composite can be a bone cement of various types including polymethylmethacrylate (PMMA).

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower." "upper," "horizontal," "vertical," "above," "below," "up," "down," "top" and "bottom" as well as derivatives thereof (e.g., "horizontally," "downwardly." "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

All of the features disclosed in this specification may be combined in any combination. Thus, unless expressly stated otherwise, each feature disclosed is only an example of a generic series of equivalent or similar features.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

Therefore, provided herein is a new and improved bone graft delivery system and method for use in spinal and orthopedic surgery, which according to various embodiments of the present invention, offers the following advantages: ease of use; reduced likelihood of syringe structure failure; the ability to more easily introduce the flowable or non-flowable bone graft material or composite into the surgical site a clinically effective and safe manner; lightness in weight; the ability to properly sterilize the bone graft delivery system; the ability to back fill surgical implants; the ability to use the bone graft delivery system in conjunction with spinal or orthopedic navigation systems and robotic arms; the ability to utilize readable pressure devices and/or be integrated with a servo-controlled motorized system for delivery of a bone graft or composite; and reduced cost.

In fact, in many of the preferred embodiments, these advantages of ease of use, reduced likelihood of syringe structure failure, the ability to more easily introduce the flowable or non-flowable bone graft material or composite into the surgical site a clinically effective and safe manner, lightness in weight, the ability to properly sterilize the bone graft delivery system, the ability to back fill surgical implants, the ability to use the bone graft delivery system in conjunction with spinal or orthopedic navigation systems and robotic arms, the ability to utilize readable pressure devices and/or be integrated with a servo-controlled motorized system for delivery of a bone graft or composite, and reduced cost are optimized to an extent that is considerably higher than heretofore achieved in prior, known bone graft delivery system and method for use in spinal and orthopedic surgery.

I claim:

1. A bone graft material delivery system comprising:
   a drive shaft;
   a drive shaft holder, wherein the drive shaft is retained within the drive shaft holder;
   a barrel holder, wherein the barrel holder is removably connected to the drive shaft holder, wherein the barrel holder further comprises;
   a barrel base,
   a first barrel opening located in the barrel base, a plurality of threaded barrel holder extensions located adjacent to the barrel base such that the first barrel opening is located between the plurality of threaded barrel holder extensions, and a second barrel opening located on the barrel holder;

a barrel assembly, wherein the barrel assembly is removably retained within the barrel holder, wherein the barrel assembly contains an amount of a bone graft material, and wherein the barrel assembly further comprises;

a base having a plurality of base openings, a plurality of barrels having first and second ends, wherein the first ends of each barrel are connected to one of the plurality of base openings, and a barrel connector having a first and second end, wherein the first end of the barrel connector is connected to the second ends of each barrel and wherein the second end of the barrel connector is threaded; and a delivery tube assembly, wherein the delivery tube assembly is removably connected to the barrel assembly, wherein the delivery tube assembly is configured to deliver the bone graft material to a surgical site through the delivery tube assembly, and wherein the delivery tube assembly further comprises;

a delivery tube base having a first end and a second end, wherein the first end of the delivery tube base is removably connected to the threaded barrel connector, a delivery tube extension having a first end and a second end, wherein the first end of the delivery tube extension is connected to the second end of the delivery tube base, an injector needle connector connected to the second end of the delivery tube extension, and an injector needle removably retained within the injector needle connector.

2. The bone graft material delivery system, according to claim 1, wherein the drive shaft further comprises:
a handle connected to the drive shaft.

3. The bone graft material delivery system, according to claim 1, wherein the drive shaft holder further comprises:
a base;
a first opening located adjacent to the base;
a plurality of base extensions located adjacent to the the base such that the first opening is located between the plurality of base extensions;
a second opening located adjacent to the base; and
an edge located adjacent to the first opening and the plurality of base extensions.

4. The bone graft material delivery system, according to claim 1, wherein the barrel assembly further comprises:
a polycarbonate (PC) pad; and
a silicone pad located adjacent to the PC pad.

5. A method of constructing a bone graft material delivery system, the method comprising:
providing a drive shaft;
attaching a drive shaft holder to the drive shaft;
removably attaching the drive shaft holder to a barrel holder, wherein the barrel holder further comprises;
providing a barrel base;
providing a first barrel opening in the barrel base,
attaching a plurality of threaded barrel holder extensions to the barrel base such that the first barrel opening is located between the plurality of threaded barrel holder extensions, and
providing a second barrel opening on the barrel holder;

providing a barrel assembly, wherein the barrel assembly is removably retained within the barrel holder, wherein the barrel assembly contains an amount of a bone graft material, and wherein the barrel assembly further comprises;

a base having a plurality of base openings, a plurality of barrels having first and second ends, wherein the first ends of each barrel are connected to one of the plurality of base openings, and a barrel connector having a first and second end, wherein the first end of the barrel connector is connected to the second ends of each barrel and wherein the second end of the barrel connector is threaded; and removably attaching the barrel assembly to a delivery tube assembly, wherein the delivery tube assembly is configured to deliver the bone graft material to a surgical site through the delivery tube assembly, and wherein the delivery tube assembly further comprises;

a delivery tube base having a first end and a second end, wherein the first end of the delivery tube base is removably connected to the threaded barrel connector, a delivery tube extension having a first end and a second end, wherein the first end of the delivery tube extension is connected to the second end of the delivery tube base, an injector needle connector connected to the second end of the delivery tube extension, and an injector needle removably retained within the injector needle connector.

6. The method, according to claim 5, wherein the providing the drive shaft further comprises:
attaching a handle to the drive shaft.

7. The method, according to claim 5, wherein the attaching the drive shaft holder further comprises:
providing a base;
providing a first opening located adjacent to the base;
providing a plurality of base extensions located adjacent to the base such that the first opening is located between the plurality of base extensions;
providing a second opening located adjacent to the base; and
providing an edge located adjacent to the first opening and the plurality of base extensions.

8. The method, according to claim 5, wherein the barrel assembly further comprises:
providing a polycarbonate (PC) pad; and
locating a silicone pad adjacent to the PC pad.

* * * * *